United States Patent
Sheng et al.

(10) Patent No.: US 8,891,268 B2
(45) Date of Patent: Nov. 18, 2014

(54) SYSTEM AND METHOD FOR SOFT-STARTING AN ISOLATED POWER SUPPLY SYSTEM

(75) Inventors: Lin Sheng, Raleigh, NC (US); Xiaojun Xu, Raleigh, NC (US)

(73) Assignee: Texas Instruments Incorporated, Dallas, TX (US)

( * ) Notice: Subject to any disclaimer, the term of this patent is extended or adjusted under 35 U.S.C. 154(b) by 820 days.

(21) Appl. No.: 12/789,790

(22) Filed: May 28, 2010

(65) Prior Publication Data

US 2011/0205764 A1 Aug. 25, 2011

Related U.S. Application Data

(60) Provisional application No. 61/306,179, filed on Feb. 19, 2010.

(51) Int. Cl.
*H02M 7/44* (2006.01)
*H02H 7/122* (2006.01)
*H02M 3/335* (2006.01)
*H02M 1/36* (2007.01)

(52) U.S. Cl.
CPC ............. *H02M 1/36* (2013.01); *Y02B 70/1475* (2013.01); *H02M 3/33592* (2013.01)
USPC .............................. 363/97; 363/49; 363/56.09

(58) Field of Classification Search
USPC ........... 323/908, 238, 266; 363/17–21.11, 49, 363/52, 53, 56.09, 56.1, 56.11, 84, 86, 78, 363/95, 97, 98, 123, 125, 127, 81
See application file for complete search history.

(56) References Cited

U.S. PATENT DOCUMENTS

| | | | | |
|---|---|---|---|---|
| 5,841,641 A * | 11/1998 | Faulk | ......................... | 363/21.14 |
| 6,058,026 A * | 5/2000 | Rozman | ......................... | 363/16 |
| 6,191,964 B1 * | 2/2001 | Boylan et al. | .................. | 363/89 |
| 6,912,138 B2 * | 6/2005 | Perry et al. | ................. | 363/21.06 |
| 7,173,831 B1 * | 2/2007 | Vogman | ......................... | 363/21.02 |
| 7,576,527 B1 * | 8/2009 | Zhang et al. | .................. | 323/284 |
| 8,243,472 B2 * | 8/2012 | Chang et al. | .................... | 363/16 |
| 8,456,867 B1 * | 6/2013 | Karlsson et al. | ................ | 363/17 |
| 8,503,194 B2 * | 8/2013 | Moussaoui et al. | ............ | 363/17 |
| 2007/0217230 A1 * | 9/2007 | Charles | ......................... | 363/20 |
| 2008/0024096 A1 * | 1/2008 | Pan | .............................. | 323/271 |
| 2008/0116862 A1 * | 5/2008 | Yang et al. | ..................... | 323/269 |
| 2009/0237969 A1 * | 9/2009 | Fukumoto et al. | ............. | 363/97 |
| 2010/0046251 A1 * | 2/2010 | Kyono | ....................... | 363/21.02 |
| 2010/0072966 A1 * | 3/2010 | Mayell | ......................... | 323/284 |
| 2010/0134085 A1 * | 6/2010 | Nishida | ......................... | 323/285 |

* cited by examiner

*Primary Examiner* — Adolf Berhane
(74) *Attorney, Agent, or Firm* — William B. Kempler; Frederick J. Telecky, Jr.

(57) ABSTRACT

One embodiment of the invention relates to a switching control system for controlling an isolated power supply. The system includes a pulse-width modulation (PWM) switching controller configured to generate at least one primary switching signal having a first duty-cycle for activating at least one primary-side switch of the isolated power supply. A synchronous rectifier (SR) switching controller is configured to generate at least one SR switching signal having a second duty-cycle for activating at least one SR switch of the isolated power supply to conduct an output current through a secondary winding of a transformer and an output inductor to generate an output voltage, the second duty-cycle being independent of the first duty-cycle in a soft-start mode.

19 Claims, 6 Drawing Sheets

SYSTEM AND METHOD FOR SOFT-STARTING AN ISOLATED POWER SUPPLY SYSTEM

CROSS-REFERENCE TO RELATED APPLICATION

This application claims the benefit of U.S. Provisional Application No. 61/306,179, filed Feb. 19, 2010, and entitled SYSTEM AND METHOD FOR SOFT-STARTING AN ISOLATED POWER SUPPLY SYSTEM, which is incorporated herein by reference in its entirety.

TECHNICAL FIELD

The invention relates generally to electronic circuits and, more specifically, to a system and method for soft-starting an isolated power supply system.

BACKGROUND

Power distribution systems provide supply voltages to a variety of electronic systems, such as telecom and/or data communication equipment. In order to reduce start-up stresses and surge currents, power distributions systems may be soft-started to allow the output voltage to gradually increase until a steady-state operating point is achieved. In isolated power supply systems, synchronous rectifiers can be implemented in the secondary-side of a power transformer for efficiency.

There are two general solutions for pre-bias start-up of an isolated power supply system. One solution is to simply keep synchronous rectifier off until output voltage reaches to certain percentage of regulated voltage, usually about 90% to about 95% of the regulated voltage. Another approach utilizes closed-loop soft-start scheme and requires direct or indirect inductor current sensing. In this second solution, the synchronous rectifier is turned off right before inductor current goes negative to prevent undershoot of the output voltage and damaging MOSFET due to the negative inductor current. For an isolated system, especially with primary side control, it tends to be difficult and costly to obtain accurate inductor information. Additionally, the varying switching frequency introduced by pulse-skipping is not allowed in some applications.

SUMMARY

One embodiment of the invention relates to a switching control system for controlling an isolated power supply. The system includes a pulse-width modulation (PWM) switching controller configured to generate at least one primary switching signal having a first duty-cycle for activating at least one primary-side switch of the isolated power supply. A synchronous rectifier (SR) switching controller is configured to generate at least one SR switching signal having a second duty-cycle for activating at least one SR switch of the isolated power supply to conduct an output current through a secondary winding of a transformer and an output inductor to generate an output voltage, the second duty-cycle being independent of the first duty-cycle in a soft-start mode.

Another embodiment of the invention includes a method for soft-starting an isolated power supply system. The method includes generating at least one primary switching signal having a first duty-cycle based on a pulse-width modulation (PWM) ramp signal. At least one primary-side switch is activated to generate a primary current through a primary winding of a transformer in response to the at least one primary switching signal. At least one synchronous rectifier (SR) switching signal is generated, the SR switching signal having a second duty-cycle based on at least one SR ramp signal, the second duty-cycle being independent of the first duty-cycle during a soft-start mode. At least one SR switch of the isolated power supply is activated to conduct a secondary current through a secondary winding of the transformer and an output inductor to balance charging and discharging of an output capacitor in response to the at least one SR switching signal such that an output voltage across the output capacitor increases substantially monotonically during the soft-start mode.

Yet another embodiment of the invention provides an integrated circuit (IC) for controlling an isolated power supply. The IC includes a primary switching controller configured to generate the at least one primary switching signal based on a first feedback voltage and having a first duty-cycle. A secondary switching controller of the IC is configured to generate the at least one SR switching signal based on a second feedback voltage, the SR switching signal having a second duty-cycle that is based on the first duty-cycle in a steady-state operating mode and having a third duty-cycle that is independent of the first duty-cycle during a soft-start mode, the third duty-cycle varying during a soft-start mode based on the second feedback voltage to mitigate overshoot and undershoot conditions in the output voltage.

DETAILED DESCRIPTION

The invention relates generally to electronic circuits and, more specifically, to a system and method for soft-starting an isolated power supply system.

A switching controller employs feedback based on the output voltage of the isolated power supply system. The switching controller also includes a pulse-width modulation (PWM) controller and a synchronous rectifier (SR) controller. The PWM controller is configured to generate switching signals for one or more primary-side switch that generates a current through a primary winding of a transformer. The SR controller is configured to generate switching signals for at least one SR switch that conducts a secondary current that flows through a secondary winding of the transformer and an output inductor to generate an output voltage. The SR controller operates in a soft-start mode to control the SR switch(es) to mitigate undershoot and overshoot of an output voltage such that the output can increase substantially monotonically in a desired manner. For example, the inductor current in the secondary side can be used to balance the output voltage. Such control can be independent of the control of the primary side switches.

In one embodiment, the SR controller includes at least one ramp generator that generates a respective at least one ramp signal. The SR controller generates the switching signals that control the SR switches. The SR controller includes a transconductance amplifier that generates a discharge signal based on the second feedback voltage and a soft-start voltage. The discharge signal can vary rapidly according to variations in the second feedback voltage to facilitate balancing the output voltage during the soft-start. As a result, the at least one ramp signal can have a falling-edge slope that varies with the second feedback voltage to mitigate undershoot and/or overshoot conditions in the output voltage.

Figure 1:
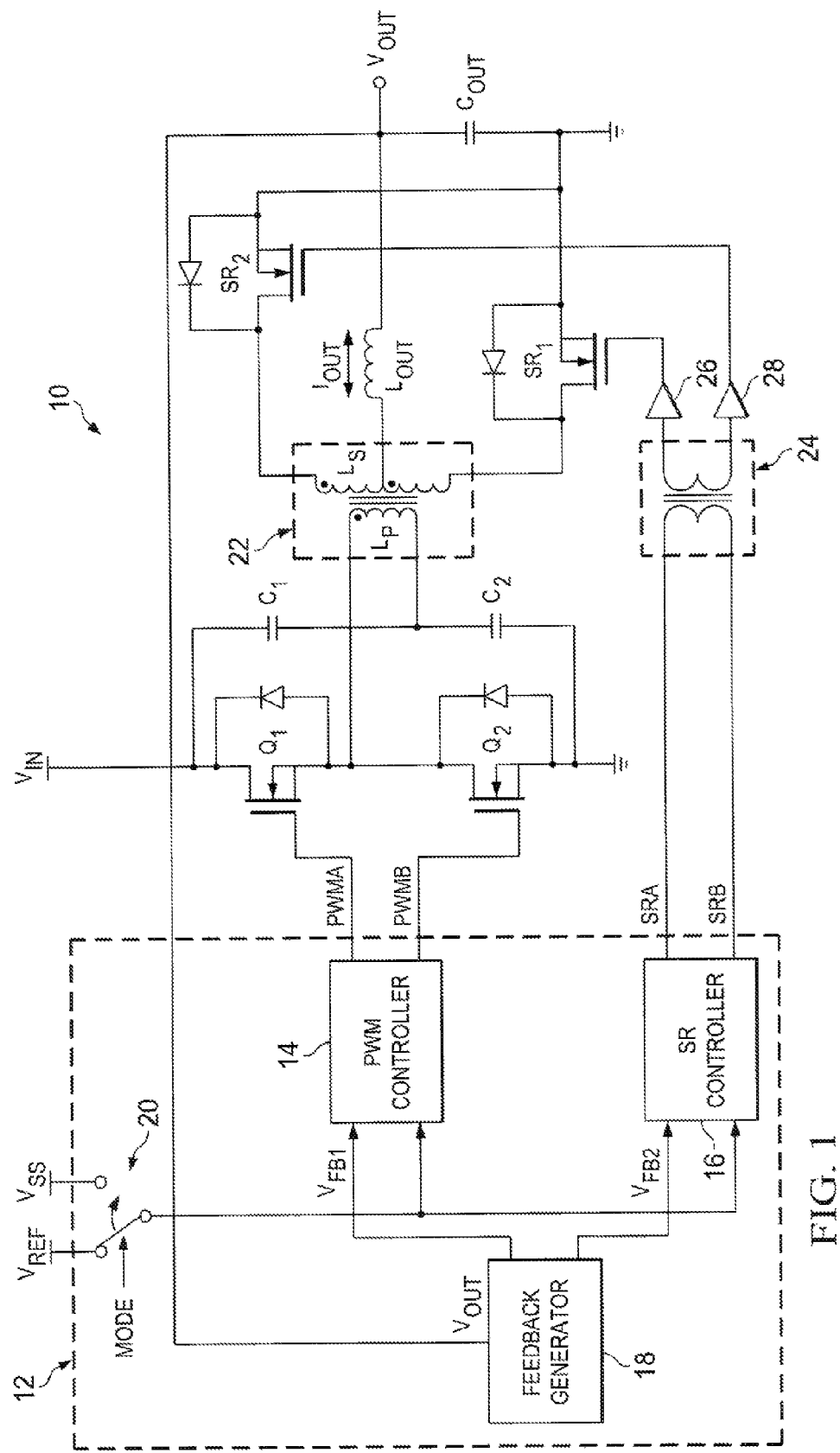
FIG. 1 illustrates an example of an isolated power supply system in accordance with an aspect of the invention.

FIG. 1 illustrates an example of an isolated power supply system 10 in accordance with an aspect of the invention. The isolated power supply system 10 generates an output voltage $V_{OUT}$ that can be implemented to provide power to any of a variety of electronic systems. The isolated power supply system 10 can be implemented in any of a variety of electronic applications.

The isolated power supply system 10 includes a switching controller 12. The switching controller 12 can be incorporated into or as part of an integrated circuit (IC). The switching controller 12 includes a pulse-width modulation (PWM) controller 14, a synchronous rectifier (SR) controller 16, and feedback circuitry 18. The feedback circuitry 18 is configured to generate a first feedback voltage $V_{FB1}$ and a second feedback voltage $V_{FB2}$ based on the output voltage $V_{OUT}$. The first and second feedback voltages $V_{FB1}$ and $V_{FB2}$ can be generated independently with respect to each other, and can have magnitudes that are approximately equal in steady-state operation of the isolated power supply system 10.

Upon initialization, the output voltage $V_{OUT}$ is between approximately zero and approximately 90% of steady-state magnitude, and needs to be increased to an appropriate magnitude to enter a steady-state mode, at which time the output voltage $V_{OUT}$ can be provided as a power source to a respective electronic system. Thus, the isolated power supply system 10 begins in a soft-start mode to increase the output voltage $V_{OUT}$ in a monotonic manner that substantially mitigates overshoot and undershoot of the output voltage $V_{OUT}$ with respect to a final, steady-state magnitude of the output voltage $V_{OUT}$.

In the example of FIG. 1, a mode signal MODE controls a switch 20 to switch between a soft-start voltage $V_{SS}$ in the soft-start mode and a reference voltage $V_{REF}$ in the steady-state mode. The reference voltage $V_{REF}$ can have a substantially constant magnitude and the soft-start voltage $V_{SS}$ can gradually increase from zero magnitude to a predetermined maximum voltage, such as by gradually charging an associated soft-start capacitor (not shown) with fixed current (e.g., 25 µA) up to a predetermined voltage. The time to charge the capacitor can define the duration of the soft-start mode, such that after the predetermined voltage has been reached, soft-start can be terminated and normal operation can begin.

In the example of FIG. 1, the PWM controller 14 is configured to generate a pair of PWM switching signals, demonstrated in the example of FIG. 1 as PWMA and PWMB, based on the first feedback voltage $V_{FB1}$ and, depending on the mode of the isolated power supply system 10, either the reference voltage $V_{REF}$ or the soft-start voltage $V_{SS}$. Similarly, the SR controller 16 is configured to generate a pair of SR switching signals, demonstrated in the example of FIG. 1 as SRA and SRB, based on the second feedback voltage $V_{FB2}$ and either the reference voltage $V_{REF}$ or the soft-start voltage $V_{SS}$.

In the half-bridge example shown in FIG. 1, the isolated power supply system 10 includes a pair of primary-side switches $Q_1$ and $Q_2$ that are controlled by the PWM switching signals PWMA and PWMB, respectively. As an example, the primary-side switches $Q_1$ and $Q_2$ can be configured as metal oxide semiconductor field effect transistors (MOSFETs). For instance, the primary-side switches $Q_1$ and $Q_2$ are alternately activated based on a defined duty-cycle of the PWM switching signals PWMA and PWMB to generate a current that flows from an input voltage $V_{IN}$ to ground via capacitors $C_1$ and $C_2$ and through a primary winding $L_P$ of a power transformer 22. The current that flows through the primary winding $L_P$ induces an output current $I_{OUT}$ in a secondary winding $L_S$ of the power transformer 22. The output current flows through an output inductor $L_{OUT}$ to generate an output voltage $V_{OUT}$ across an output capacitor $C_{OUT}$.

To maintain the output current $I_{OUT}$ through the output inductor $L_{out}$, the isolated power supply system 10 includes a pair of SR switches $SR_1$ and $SR_2$ (e.g., MOSFETs) that are activated by a respective pair of SR switching signals SRA and SRB via a transformer 24 and a pair of buffers 26 and 28. The SR switches $SR_1$ and $SR_2$ are thus activated to efficiently conduct the output current $I_{OUT}$ from ground through the output inductor $L_{OUT}$ based on the direction of the flow of the output current $I_{OUT}$ through the secondary winding $L_S$ of the power transformer 12.

In the soft-start mode, the manner in which the SR switches $SR_1$ and $SR_2$ are activated is important to substantially mitigate damage, such as damage to the primary winding $L_P$ of the power transformer 22 or to the SR switches $SR_1$ and $SR_2$ themselves, resulting from a buildup of the output current $I_{OUT}$. Therefore, the SR controller 16 generates the SR switching signals SRA and SRB to have a duty-cycle during the soft-start mode that is independent of the duty-cycle of the PWM switching signals PWMA and PWMB.

It is to be understood that the isolated power supply system 10 is not intended to be limited to the example of FIG. 1. As an example, the isolated power supply system 10 is not limited to including two of each of the primary-side switches $Q_1$ and $Q_2$ and the SR switches $SR_1$ and $SR_2$, but could instead include more switches, such as in a full-bridge topology, or less. As another example, the isolated power supply system 10 could include any of a variety of additional circuit devices for generating the output voltage $V_{OUT}$ that have been omitted in the example of FIG. 1 for simplicity. Furthermore, the arrangement of the mode signal MODE and the switch 20 can be configured in any of a variety of different manners, and is demonstrated as having the switch 20 in the example of FIG. 1 to differentiate between the substantially constant magnitude of the reference voltage and the steadily and linearly increasing magnitude of the soft-start voltage $V_{SS}$. It will be further understood that the approach shown and described herein can be utilized for soft-start of other applications, such as including full-bridge switching systems as well as interleaved forward and push-pull isolated converters. Accordingly, the isolated power supply system 10 and the controller 12 can be configured in any of a variety of ways.

As one example, the SR controller 16 can generate a separate ramp signal for each of the SR switches. The separate ramp signals can have a frequency that is half the frequency of a ramp signal associated with the PWM switching signals generated by the PWM controller. The separate ramp signals for each of the SR switches can also be 180° out-of-phase with respect to each other. As a result, the duty-cycle of the switching signals generated by the SR controller can vary during the soft-start mode from a minimum of zero up to less than 1-D, where D is the duty-cycle of the PWM switching signals.

As another example, the SR controller 16 can generate a single ramp signal having the same frequency as the PWM switching signals. The single ramp signal can have a DC offset with respect to the PWM switching signals, and can have a duty-cycle that varies from a minimum of approximately 50% (which begins when the PWM switching signals start) up to a duty cycle that is less than 1-D during the soft-start mode. As a result of the operation of the SR switches in conjunction with the operation of the primary-side switches, and as a result of the variable falling-edge slope of the ramp signals based on which the SR switching signals are generated, the isolated power supply system can increase the output voltage monotonically during a soft-start.

Figure 2:
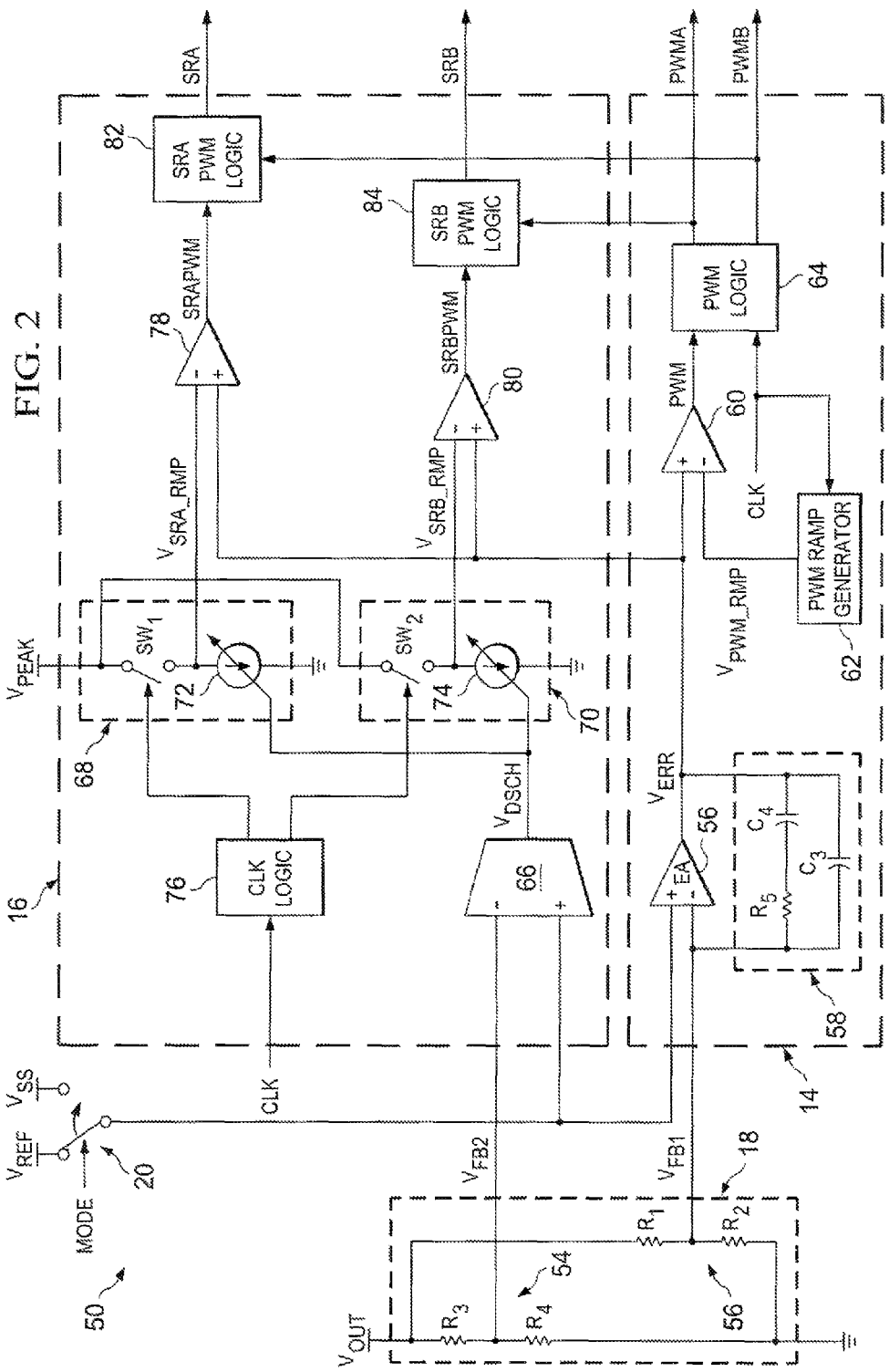
FIG. 2 illustrates an example of a switching controller in accordance with an aspect of the invention.

FIG. 2 illustrates an example of a switching controller 50 that can be implemented in accordance with an aspect of the invention. The switching controller 50 can correspond to the switching controller 12 in the example of FIG. 1. Therefore, reference can be made to the example of FIG. 1 in the following description of the example of FIG. 2.

The switching controller 50 includes the PWM controller 14, the SR controller 16, and the feedback circuitry 18. In this example, the feedback circuitry 18 includes a first voltage divider 52 that includes resistors $R_1$ and $R_2$ and a second voltage divider 54 that includes resistors $R_3$ and $R_4$. The first voltage divider 52 divides the output voltage $V_{OUT}$ to generate the first feedback voltage $V_{FB1}$ and the second voltage divider 54 divides the output voltage $V_{OUT}$ to generate the second feedback voltage $V_{FB2}$. As an example, the resistance ratio $(R_1/R_2)$ of the first voltage divider 52 can be approximately equal to the resistance ratio $(R_3/R_4)$ of the second voltage divider 54, such that the first and second feedback voltages $V_{FB1}$ and $V_{FB2}$ can have the same nominal voltage magnitude. However, during soft-start mode, the switching controller 50 is configured such that the magnitude of the second feedback voltage $V_{FB2}$ can more rapidly increase to follow the increasing output voltage $V_{OUT}$ than the first feedback voltage $V_{FB1}$.

The PWM controller 14 includes an error amplifier 56 that receives the first feedback voltage $V_{FB1}$ at an inverting input and receives either the soft-start voltage $V_{SS}$ or the reference voltage $V_{REF}$ at a non-inverting input. The error amplifier 56 generates an error signal $V_{ERR}$ that has a magnitude that varies based on a magnitude difference between the first feedback voltage $V_{FB1}$ and the reference voltage $V_{REF}$ or the soft-start voltage $V_{SS}$. A loop compensation filter 58 couples inverting input of error amplifier 56 and the error signal $V_{ERR}$. For example, the loop compensation filter 58 can include a capacitor $C_3$ in parallel with a series connection of a resistor $R_5$ and a capacitor $C_4$. The error signal $V_{ERR}$ is provided to a comparator 60 that compares the error signal $V_{ERR}$ at a non-inverting input to a ramp signal $V_{PWM\_RMP}$ at an inverting input.

In the example of FIG. 2, the ramp signal $V_{PWM\_RMP}$ is generated by a PWM ramp generator 62 to have a frequency that is based on each pulse of a clock signal CLK. In response to the comparison, the comparator 60 generates a signal PWM that is provided to PWM logic 64. The PWM logic 64 generates the PWM switching signals PWMA and PWMB for controlling the primary-side switches $Q_1$ and $Q_2$ of an isolated power supply system. As an example, the PWM logic 64 could include a flip-flop and/or a multiplexer, such that the PWM switching signals PWMA and PWMB are substantially the same as the signal PWM on alternating pulses of the clock signal CLK.

The SR controller 16 includes a transconductance amplifier 66 that receives the second feedback voltage $V_{FB2}$ at an inverting input and receives either the soft-start voltage $V_{SS}$ or the reference voltage $V_{REF}$ at a non-inverting input. The transconductance amplifier 66 generates a discharge signal $V_{DSCH}$ at its output, which has a magnitude that varies based on a magnitude difference between the second feedback voltage $V_{FB2}$ and the reference voltage $V_{REF}$ or the soft-start voltage $V_{SS}$ (depending on the mode). The transconductance amplifier 66 has a more rapid response time relative to the error amplifier 56. This is because a loop compensation filter 58 provides an increased time constant that causes the feedback voltage $V_{FB1}$ to change more slowly in response to changes in the output signal $V_{OUT}$. Since the second feedback voltage $V_{FB2}$ changes magnitude more quickly in response to changes in the magnitude of the output voltage $V_{OUT}$, the discharge signal $V_{DSCH}$ responds very rapidly to changes in the output voltage $V_{OUT}$.

The discharge signal $V_{DSCH}$ is provided to each of a first SR ramp generator 68 and a second ramp generator 70 that generate a first SR ramp signal $V_{SRA\_RMP}$ and $V_{SRB\_RMP}$, respectively. The first ramp generator 68 includes a variable current supply 72 that is controlled by the discharge signal $V_{DSCH}$ and a switch $SW_1$ and the second ramp generator 70 includes a variable current supply 74 that is controlled by the discharge signal $V_{DSCH}$ and a switch $SW_2$. The SR controller 14 includes clock logic 76 that generates a first clock signal and a second clock signal based on the clock signal CLK. As an example, the clock logic 76 can include a flip-flop or multiplexer, such that the first and second clock signals can each be alternating pulses provided at half the frequency of the clock signal CLK. The first clock signal CLK_A closes the switch $SW_1$ at each pulse to provide a rising-edge of the first SR ramp signal $V_{SRA\_RMP}$ and the second clock signal CLK_B closes the switch $SW_2$ at each pulse to provide a rising-edge of the second SR ramp signal $V_{SRB\_RMP}$ based on a peak voltage $V_{PEAK}$ (e.g., proportional to an input voltage $V_{IN}$). Therefore, the first and second SR ramp signals $V_{SRA\_RMP}$ and $V_{SRB\_RMP}$ are approximately 180° out-of-phase with respect to each other and each have a frequency that is approximately half of the PWM ramp signal $V_{PWM\_RMP}$. In addition, each of the first and second SR ramp signals $V_{SRA\_RMP}$ and $V_{SRB\_RMP}$ have a falling-edge slope that is controlled by the magnitude of the discharge signal $V_{DSCH}$.

The first SR ramp signal $V_{SRA\_RMP}$ is provided to an inverting input of a comparator 78 and the second SR ramp signal $V_{SRB\_RMP}$ is provided to an inverting input of a comparator 80. The error signal $V_{ERR}$ is provided to the non-inverting input of each of the comparators 78 and 80. Therefore, the comparator 78 compares the error signal $V_{ERR}$ to the first SR ramp signal $V_{SRA\_RMP}$ and the comparator 80 compares the error signal $V_{ERR}$ to the second SR ramp signal $V_{SRB\_RMP}$. In response to the comparison, the comparator 78 generates a PWM signal SRAPWM that is provided to SRA PWM logic 82 and the comparator 80 generates another PWM signal SRBPWM that is provided to SRB PWM logic 84. The SRA PWM logic 82 generates the SR switching signal SRA and the SRB PWM logic 84 generates the SR switching signal SRB for controlling the SR switches $SR_1$ and $SR_2$, respectively. As an example, the SRA PWM logic 82 could be configured to set the duty-cycle of the SR switching signal SRA to be between a minimum of approximately zero and less than $1-D_B$, where $D_B$ is the duty-cycle of the PWM switching signal PWMB in the soft-start mode, and to have a duty-cycle of $1-D_B$ in the steady-state mode. Similarly, the SRB PWM logic 84 could be configured to set the duty-cycle of the SR switching signal SRB to be between a minimum of approximately zero and less than 1-$D_A$, where $D_A$ is the duty-cycle of the PWM switching signal PWMA in the soft-start mode, and to have a duty-cycle of 1-$D_A$ in the steady-state mode.

Figure 3:
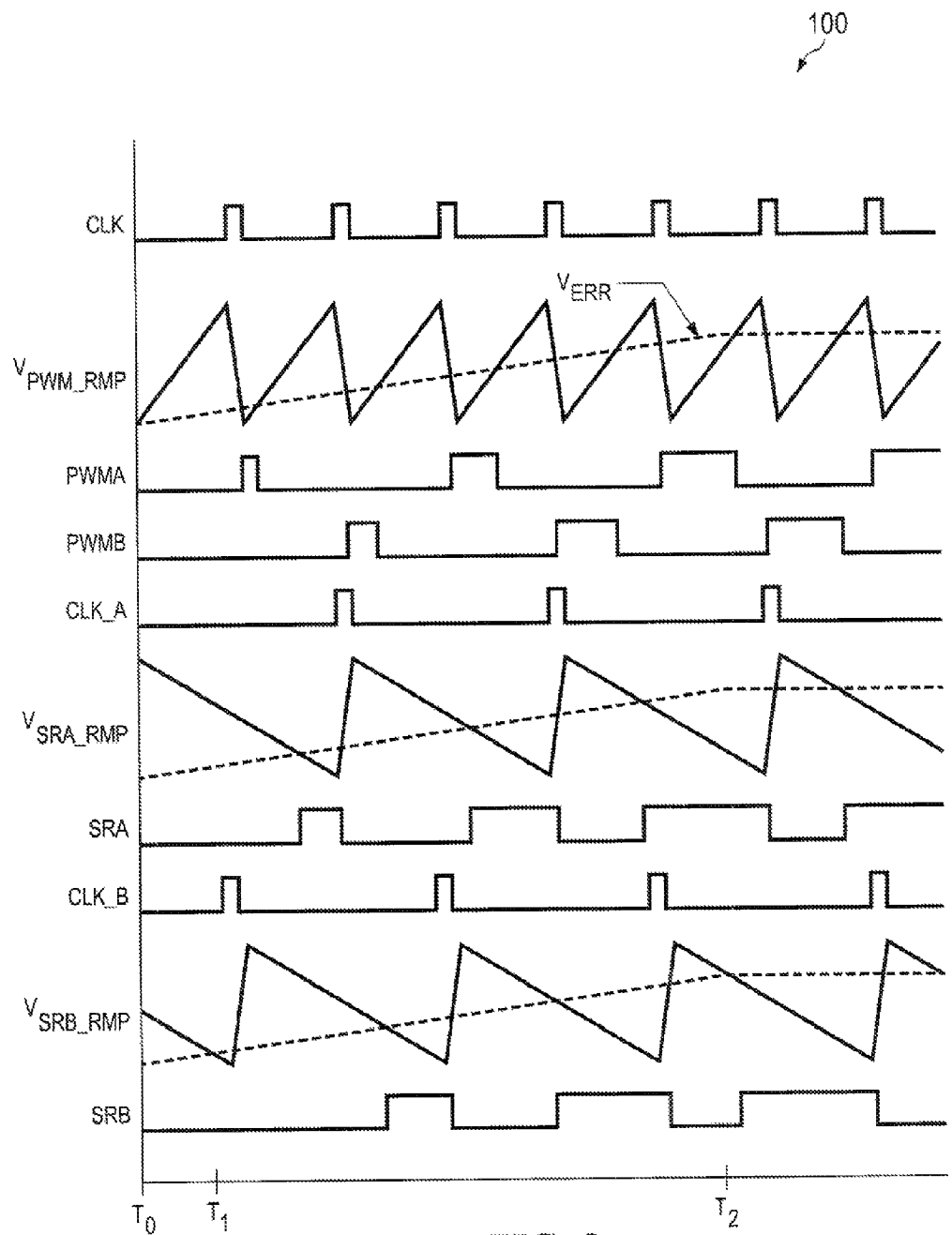
FIG. 3 illustrates an example of a timing diagram of signals from an isolated power supply in accordance with an aspect of the invention.

FIG. 3 illustrates an example of a timing diagram 100 of signals in an isolated power supply operating in accordance with an aspect of the invention. The timing diagram 100 could correspond to the isolated power supply system 10 and associated switching controller 50 in the examples of FIGS. 1 and 2, respectively. Therefore, reference can be made to the examples of FIGS. 1 and 2 for additional context in the following description of the example of FIG. 3.

The timing diagram 100 demonstrates the relative timing of the clock signals CLK, CLK_A, and CLK_B; the ramp signals $V_{PWM\_RMP}$, $V_{SRA\_RMP}$, and $V_{SRB\_RMP}$; the PWM switching signals PWMA and PWMB; and the SR switching signals SRA and SRB. The PWM ramp signal $V_{PWM\_RMP}$ is demonstrated in the example of FIG. 3 as having a frequency that is approximately the same as the clock signal CLK, with the falling edge of the PWM ramp signal $V_{PWM\_RMP}$ being aligned with each pulse of the clock signal CLK. The SR ramp signal $V_{SRA\_RMP}$ is demonstrated as having a frequency that is equal to the frequency of the clock signal CLK_A (i.e., half the frequency of the PWM ramp signal $V_{PWM\_RMP}$), with the falling edge of the SR ramp signal $V_{SRA\_RMP}$ being aligned with each pulse of the clock signal CLK_A. Similarly, the SR ramp signal $V_{SRB\_RMP}$ is demonstrated as having a frequency that is equal to the frequency of the clock signal CLK_B, with the falling edge of the SR ramp signal $V_{SRB\_RMP}$ being aligned with each pulse of the clock signal CLK_B. That is, the SR ramp signal $V_{SRA\_RMP}$ rises during every other clock pulse in alternating with the SR ramp signal $V_{SRB\_RMP}$.

As demonstrated in the example of FIG. 3, the error signal $V_{ERR}$ is demonstrated as superimposed over all three of the ramp signals $V_{PWM\_RMP}$, $V_{SRA\_RMP}$, $V_{SRB\_RMP}$. The error signal $V_{ERR}$ has a magnitude that increases (e.g., steadily and linearly) from zero at a time $T_0$ to a later time $T_2$ based on the increase of the soft-start voltage $V_{SS}$ during the soft-start mode. Thus, the isolated power supply system 10 is in the soft-start mode between the times $T_0$ and $T_2$. At the time $T_2$, the soft-start voltage $V_{SS}$ has a value that is approximately equal to a predetermined maximum voltage (e.g., which may approximate the reference voltage $V_{REF}$), and thus demonstrates that the isolated power supply system 10 has entered the steady-state (e.g., normal operating) mode.

In the example of FIG. 3, the PWM switching signals PWMA and PWMB are each asserted upon the error signal $V_{ERR}$ being greater than the PWM ramp signal $V_{PWM\_RMP}$ at alternating pulses of the clock signal CLK. Similarly, the SR switching signal SRA is asserted upon the error signal $V_{ERR}$ being greater than the SR ramp signal $V_{SRA\_RMP}$ and the SR switching signal SRB is asserted upon the error signal $V_{ERR}$ being greater than the SR ramp signal $V_{SRB\_RMP}$. It is to be understood that the SR switching signal SRB is not asserted at the time $T_1$, the first time that the error signal $V_{ERR}$ is greater than the SR ramp signal $V_{SRB\_RMP}$. Instead, the SR switching signals SRA and SRB are held low until either of the PWM switching signals PWMA and PWMB are asserted. Therefore, at the time $T_1$, no primary current flows through the primary winding $L_P$ of the power transformer 22, and thus the output current $I_{OUT}$ has a zero magnitude. As an example, the SRA PWM logic 82 and the SRB PWM logic 84 can be configured to not assert the respective SR switching signals SRA and SRB until at least one of the PWM switching signals PWMA and PWMB has been asserted first.

Figure 4:
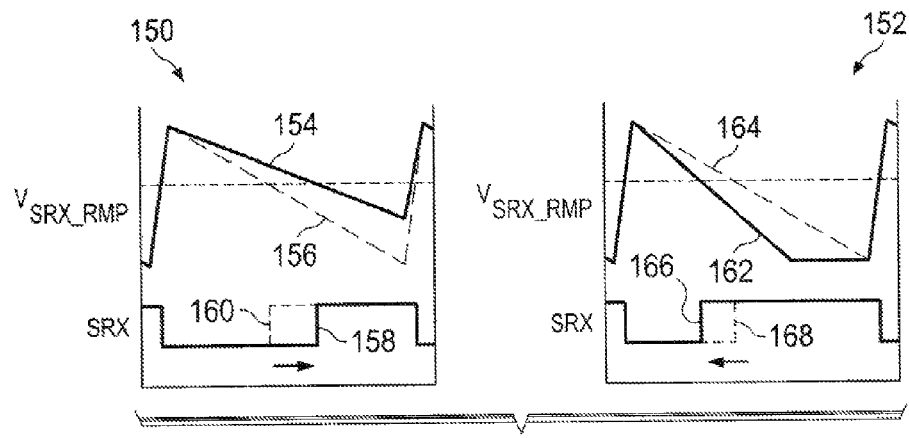
FIG. 4 illustrates another example of timing diagrams of synchronous rectifier ramp signals and associated switching signals in accordance with an aspect of the invention.

FIG. 4 illustrates another example of timing diagrams 150 and 152 of respective synchronous rectifier ramp signals and associated switching signals in accordance with an aspect of the invention. The timing diagram 150 could correspond to the isolated power supply system 10 and associated switching controller 50 in the examples of FIGS. 1 and 2, respectively. Therefore, reference is to be made to the examples of FIGS. 1 and 2 in the following description of the example of FIG. 4.

As described above with respect to the example of FIG. 2, each of the first and second SR ramp signals $V_{SRA\_RMP}$ and $V_{SRB\_RMP}$ have a falling-edge slope that is controlled by the magnitude of the discharge signal $V_{DSCH}$, such that undershoot and overshoot associated with the output voltage $V_{OUT}$ can be substantially mitigated, thereby resulting in substantially monotonically increasing output voltage $V_{OUT}$ during the soft-start mode. The timing diagrams 150 and 152 thus demonstrate a single period of a ramp signal $V_{SRX\_RMP}$ that is demonstrated generically in the example of FIG. 4 as corresponding to either of the first and second SR ramp signals $V_{SRA\_RMP}$ and $V_{SRB\_RMP}$. The timing diagrams 150 and 152 also demonstrate the error signal $V_{ERR}$ superimposed over the ramp signal $V_{SRX\_RMP}$, with the error signal $V_{ERR}$ having a substantially constant magnitude, thus indicating steady-state mode of the isolated power supply system 10. The timing diagrams 150 and 152 also demonstrate an SR switching signal SRX that is demonstrated generically in the example of FIG. 4 as corresponding to either of the first and second SR switching signals SRA and SRB.

The timing diagrams 150 and 152 demonstrate the results of changes in the second feedback voltage $V_{FB2}$ that result in substantial mitigation of an undershoot condition and an overshoot condition associated with the output voltage $V_{OUT}$, respectively. For instance, undershoot and overshoot conditions associated with the output voltage $V_{OUT}$ can typically result in the magnitude of the output voltage $V_{OUT}$ being less than and greater than a desired regulated magnitude, respectively. The first feedback voltage $V_{FB1}$ may not immediately respond to a change in the output voltage based on the coupling of the loop compensation filter 58 to the error amplifier 56. Thus, in the timing diagrams 150 and 152, the error signal $V_{ERR}$ is demonstrated as substantially constant, such that it is demonstrated as being substantially unaffected by rapid changes in the output voltage $V_{OUT}$. However, the magnitude of the second feedback voltage $V_{FB2}$ can respond almost immediately to rapid changes in the output voltage $V_{OUT}$ based on being generated independently of the first feedback voltage $V_{FB1}$. Thus, based on the substantially rapid response time of the second feedback voltage $V_{FB2}$ (due to the absence of the feedback filter 58) and based on the second feedback voltage $V_{FB2}$ being provided to the transconductance amplifier 66, the discharge signal $V_{DSCH}$ can change magnitude substantially immediately in response to the changes in the output voltage $V_{OUT}$.

In the timing diagram 150, a substantial immediate change in the magnitude of discharge signal $V_{DSCH}$ to substantially mitigate an undershoot condition is demonstrated by a solid line 154. For example, in response to a reduction in magnitude of the output voltage $V_{OUT}$, the discharge signal $V_{DSCH}$ is reduced in magnitude based on the corresponding reduction in magnitude of the second feedback voltage $V_{FB2}$. As a result, the ramp signal $V_{SRX\_RMP}$ is demonstrated by the solid line 154 as having a slope that is decreased (i.e., less negative) relative to the nominal slope, demonstrated by the dashed line 156. In response to the decreased slope of the ramp signal $V_{SRX\_RMP}$, the SR switching signal SRX has a respective decrease in duty-cycle to automatically substantially mitigate the undershoot condition. For example, because the ramp signal remains greater than the error voltage $V_{ERR}$ for a longer time based on the decreased slope relative to the nominal slope, the assertion of the SR switching signal SRX is delayed, as demonstrated by the solid line 158 relative to the nominal time of assertion that is demonstrated by the dashed line 160. Accordingly, the change in duty-cycle of the SR switching signal SRX can result in an increase in the magnitude of the output voltage $V_{OUT}$ to substantially mitigate undershoot conditions associated with the output voltage $V_{OUT}$.

In the timing diagram 152, a substantial immediate change in the magnitude of discharge signal $V_{DSCH}$ to substantially mitigate an overshoot condition is demonstrated by a solid line 162. For instance, in response to an increase in magnitude of the output voltage $V_{OUT}$, the discharge signal $V_{DSCH}$ is increased in magnitude based on the corresponding increase in magnitude of the second feedback voltage $V_{FB2}$. As a result, the ramp signal $V_{SRX\_RMP}$ is demonstrated by the solid line 162 as having a slope that is increased (i.e., more negative) relative to the nominal slope, demonstrated by the dashed line 164, until it achieves zero magnitude through the remainder of the period. In response to the increased slope of the ramp signal $V_{SRX\_RMP}$, the SR switching signal SRX has a respective increase in duty-cycle to automatically substantially mitigate the overshoot condition. Thus, because the ramp signal remains greater than the error voltage $V_{ERR}$ for less time based on the increased slope relative to the nominal slope, the assertion of the SR switching signal SRX occurs sooner, as demonstrated by the solid line 166 relative to the nominal time of assertion that is demonstrated by the dashed line 168. Accordingly, the change in duty-cycle of the SR switching signal SRX can result in a decrease in the magnitude of the output voltage $V_{OUT}$ to substantially mitigate overshoot conditions associated with the output voltage $V_{OUT}$.

It is therefore demonstrated that, based on the operation of the SR switches $SR_1$ and $SR_2$ by the SR controller 16, negative current flow associated with the output inductor $L_{OUT}$ provides for balanced charging and discharging of the output capacitor $C_{OUT}$. Therefore, the output voltage $V_{OUT}$ can increase monotonically while substantially mitigating overshoot and undershoot associated with the output voltage $V_{OUT}$, and while maintaining switching of the primary-side switches in every cycle at a constant frequency, to provide soft-starting of the isolated power supply system 10.

It is to be understood that the switching controller 50 is not intended to be limited to the example of FIG. 2. As an example, the soft-start voltage $V_{SS}$ is provided in the example of FIG. 2 in a closed-loop manner. However, it is to be understood that the soft-start voltage $V_{SS}$ could instead by provided in an open-loop manner. For example, the error amplifier 56 and the transconductance amplifier 66 could receive the reference voltage $V_{REF}$ in both the soft-start mode and the steady-state mode, and the soft-start voltage $V_{SS}$ could be switched to the non-inverting inputs of the comparators 60, 78, and 80 instead of the error signal $V_{ERR}$ during the soft-start mode.

Figure 5:
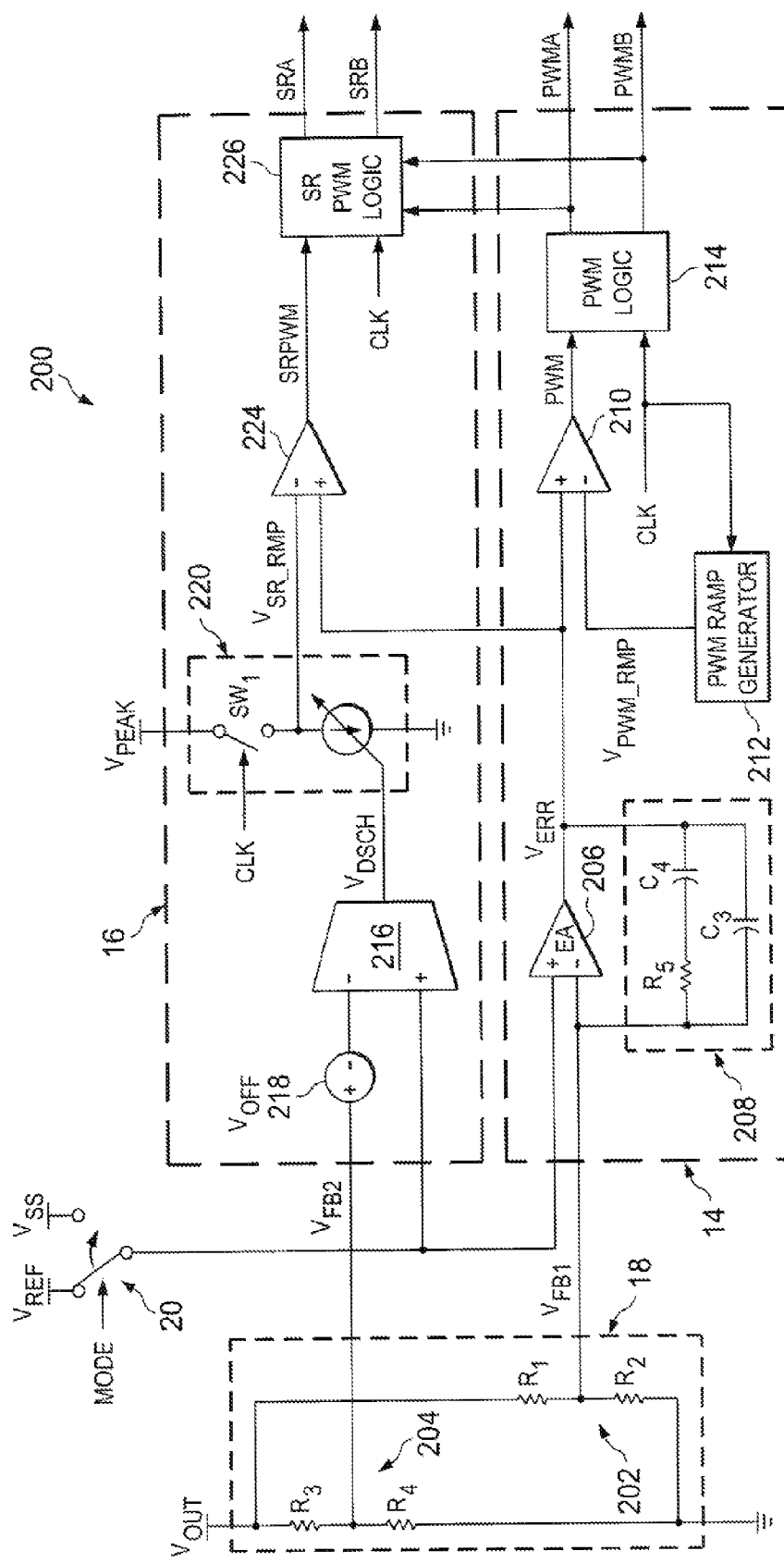
FIG. 5 illustrates another example of a switching controller in accordance with an aspect of the invention.

FIG. 5 illustrates another example of a switching controller 200 in accordance with an aspect of the invention. The switching controller 200 can correspond to the switching controller 12 in the example of FIG. 1 as an alternative embodiment of the switching controller 50 in the example of FIG. 2. Therefore, reference can be made to the example of FIG. 1 in the following description of the example of FIG. 5.

The switching controller 200 includes the PWM controller 14, the SR controller 21, and the feedback circuitry 18. The feedback circuitry 18 includes the first voltage divider 202 that includes the resistors $R_1$ and $R_2$ and the second voltage divider 204 that includes resistors $R_3$ and $R_4$. The first voltage divider 202 thus divides the output voltage $V_{OUT}$ to generate the first feedback voltage $V_{FB1}$ and the second voltage divider 54 thus divides the output voltage $V_{OUT}$ to generate the second feedback voltage $V_{FB2}$. As an example, the resistance ratio ($R_1/R_2$) of the first voltage divider 202 can be approximately equal to the resistance ratio ($R_3/R_4$) of the second voltage divider 204, such that the first and second feedback voltages $V_{FB1}$ and $V_{FB2}$ can have the same nominal magnitude during steady-state operation.

The PWM controller 14 can be configured substantially similarly to that shown and described with respect to the example of FIG. 2. Briefly stated, the PWM controller includes an error amplifier 206 that receives the first feedback voltage $V_{FB1}$ at an inverting input and receives either the soft-start voltage $V_{SS}$ or the reference voltage $V_{REF}$ at a non-inverting input. The error amplifier 206 generates the error signal $V_{ERR}$ that has a magnitude that varies based on a magnitude difference between the first feedback voltage $V_{FB1}$ and the reference voltage $V_{REF}$ or the soft-start voltage $V_{SS}$. It is to be understood that, similar to as described above regarding the example of FIG. 2, the switching system 200 could alternatively be configured as an open-loop system. For example, the soft-start voltage $V_{SS}$ could be switched to replace the error signal $V_{ERR}$ during the soft-start mode instead of replacing the reference voltage $V_{REF}$. The loop compensation filter 208 couples the first feedback voltage $V_{FB1}$ and the error signal $V_{ERR}$ as mentioned above with respect to the filter 58 of FIG. 2 The loop compensation filter includes the capacitor $C_3$ in parallel with a series connection of the resistor $R_5$ and the capacitor $C_4$. The error signal $V_{ERR}$ is provided to a comparator 210 that compares the error signal $V_{ERR}$ at a non-inverting input to a ramp signal $V_{PWM\_RMP}$ at an inverting input. In the example of FIG. 5, the ramp signal $V_{PWM\_RMP}$ is generated by a PWM ramp generator 212 to have a frequency that is based on each pulse of a clock signal CLK. In response to the comparison, the comparator 210 generates the signal PWM that is provided to PWM logic 214. The PWM logic 214 generates the PWM switching signals PWMA and PWMB for controlling the primary-side switches $Q_1$ and $Q_2$. As an example, the PWM logic 214 could include a flip-flop and/or a multiplexer, such that the PWM switching signals PWMA and PWMB are substantially the same as the signal PWM on alternating pulses of the clock signal CLK.

The SR controller 16 includes a transconductance amplifier 216 and a voltage source 218. The voltage source 218 is configured to add a DC offset voltage VOFF to the second feedback voltage $V_{FB2}$, with the DC offset of the second feedback voltage $V_{FB2}$ being provided to an inverting input of the transconductance amplifier 216 and with either the soft-start voltage $V_{SS}$ or the reference voltage $V_{REF}$ being provided to a non-inverting input. The transconductance amplifier 216 generates a discharge signal $V_{DSCH}$ having a magnitude that varies based on a difference between the second feedback voltage $V_{FB2}$ and the reference voltage $V_{REF}$ or the soft-start voltage $V_{SS}$ during the soft-start mode. However, the transconductance amplifier 216 has a more rapid response time relative to the error amplifier 206, and because the second feedback voltage $V_{FB2}$ is not coupled to a loop compensation filter, such as the loop compensation filter 208, the second feedback voltage $V_{FB2}$ can change magnitude more quickly in response to changes in the magnitude of the output voltage $V_{OUT}$. As a result, the discharge signal $V_{DSCH}$ responds very rapidly to changes in the output voltage $V_{OUT}$. The second feedback voltage $V_{FB2}$ can be shifted via an offset voltage 218, such that the feedback voltage has an increased DC level relative to the soft-start voltage $V_{SS}$ that is provided to the non-inverting input of the transconductance amplifier 216.

The discharge signal $V_{DSCH}$ is provided to an SR ramp generator 220 that generate a SR ramp signal $V_{SR\_RMP}$. The ramp generator 220 includes a variable current supply 222 that is controlled by the discharge signal $V_{DSCH}$ and a switch $SW_1$. A clock signal CLK closes the switch $SW_1$ at each clock pulse to provide a rising-edge of the SR ramp signal $V_{SR\_RMP}$ based on a peak voltage $V_{PEAK}$. Therefore, the SR ramp signal $V_{SR\_RMP}$ has the same frequency as the PWM ramp signal $V_{PWM\_RMP}$ and has a magnitude that is DC offset from the PWM ramp signal $V_{PWM\_RMP}$ by the DC offset voltage VOFF. In addition, similar to the first and second SR ramp signals $V_{SRA\_RMP}$ and $V_{SRB\_RMP}$ in the example of FIG. 2, the SR ramp signal $V_{SR\_RMP}$ has a falling-edge slope that is controlled by the magnitude of the discharge signal $V_{DSCH}$.

The SR ramp signal $V_{SR\_RMP}$ is provided to an inverting input of a comparator 224, and the error signal $V_{ERR}$ is provided to the non-inverting input of the comparator 224. The comparator 224 compares the error signal $V_{ERR}$ to the SR ramp signal $V_{SR\_RMP}$ to generate a PWM signal SRPWM. The SRPWM signal is provided to SR PWM logic 226 that, in turn, generates the SR switching signals SRA and SRB.

As an example, the SR PWM logic 226 can be configured to alternate the assertion of the SR switching signals SRA and SRB on each pulse of the clock signal CLK. Based on the magnitude of the DC offset voltage VOFF and the configuration of the SR PWM logic 226, the duty-cycle of the SR switching signals SRA and SRB can be set at approximately $1-D_B$ and $1-D_A$, respectively, where $D_B$ and $D_A$ are the respective duty-cycles of the PWM switching signals PWMB and PWMA in the steady-state mode, and to be between a minimum of approximately 50% and less than approximately $1-D_B$ and $1-D_A$, respectively, in the soft-start mode.

Figure 6:
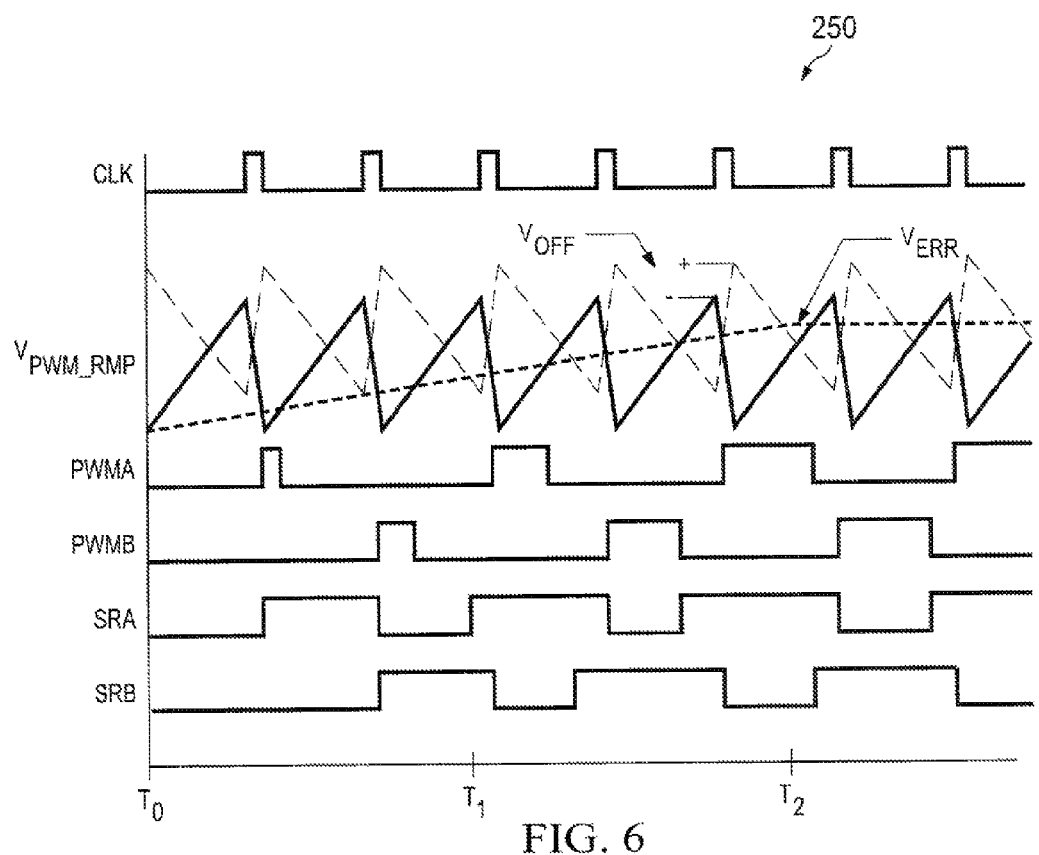
FIG. 6 illustrates yet another example of a timing diagram of signals from an isolated power supply in accordance with an aspect of the invention.

FIG. 6 illustrates another example of a timing diagram 250 of an isolated power supply in accordance with an aspect of the invention. The timing diagram 250 could correspond to the isolated power supply system 10 and associated switching controller 200 in the examples of FIGS. 1 and 5, respectively. Therefore, reference is to be made to the examples of FIGS. 1 and 5 in the following description of the example of FIG. 6.

The timing diagram 250 demonstrates the relative timing of the clock signal CLK, the ramp signals $V_{PWM\_RMP}$ and $V_{SR\_RMP}$, the PWM switching signals PWMA and PWMB, and the SR switching signals SRA and SRB. The PWM ramp signal $V_{PWM\_RMP}$ and the SR ramp signal $V_{SR\_RMP}$ are demonstrated in the example of FIG. 6 as superimposed with respect to each other, with the SR ramp signal $V_{SR\_RMP}$ having a DC offset relative to the PWM ramp signal $V_{PWM\_RMP}$ (e.g., by the DC offset voltage VOFF). The PWM ramp signal $V_{PWM\_RMP}$ and the SR ramp signal $V_{SR\_RMP}$ each have a frequency that is approximately the same as the clock signal CLK, with the falling edge of the PWM ramp signal $V_{PWM\_RMP}$ and the rising-edge of the SR ramp signal SR_RMP being aligned with each pulse of the clock signal CLK.

As demonstrated in the example of FIG. 6, the error signal $V_{ERR}$ is demonstrated as superimposed over the ramp signals $V_{PWM\_RMP}$ and $V_{SR\_RMP}$. The error signal $V_{ERR}$ has a magnitude that steadily and linearly increases from zero from a time $T_0$ to a time $T_2$ based on the steady and linear increase of the soft-start voltage $V_{SS}$. Thus, the isolated power supply system 10 is in the soft-start mode between the times $T_0$ and $T_2$. At the time $T_2$, the soft-start voltage $V_{SS}$ (or $V_{ERR}$) has a value that is approximately equal to the reference voltage $V_{REF}$, and thus demonstrates that the isolated power supply system 10 has entered the steady-state mode.

In the example of FIG. 6, the PWM switching signals PWMA and PWMB are each asserted upon the error signal $V_{ERR}$ being greater than the PWM ramp signal $V_{PWM\_RMP}$ at alternating pulses of the clock signal CLK. Prior to a time $T_1$, when the error voltage $V_{ERR}$ is less than a minimum magnitude of the SR ramp signal $V_{SR\_RMP}$, the SR switching signals SRA and SRB are likewise asserted when the PWM switching signals PWMA and PWMB. The SR switching signals SRA and SRB remain asserted until the PWM switching signals PWMB and PWMA, respectively, become asserted. That is, prior to the time $T_1$ (when $V_{ERR}$ crosses SR ramp signal SR_RMP), the SR switching signals SRA and SRB have a minimum duty-cycle of approximately 50%.

At the time $T_1$, upon the error signal $V_{ERR}$ being greater than the SR ramp signal $V_{SR\_RMP}$ for the first time, the SR switching signal SRA is asserted prior to the PWM switching signal PWMA. Therefore, subsequent to the time $T_1$, the duty-cycle of the SR switching signals increases above approximately 50% along with the increase of the error signal $V_{ERR}$. The SR switching signals SRA and SRB achieve a maximum duty-cycle subsequent to the time $T_2$ (i.e., the steady-state mode) of $1-D_B$ and $1-D_A$, respectively. As a result of setting the minimum duty-cycle of the SR switching signals SRA and SRB to approximately 50%, the isolated power supply 10 can have better initial management of the charging and discharging of the output inductor $L_{OUT}$, such that the isolated power supply system 10 can better mitigate overshoot and undershoot conditions.

Figure 7:
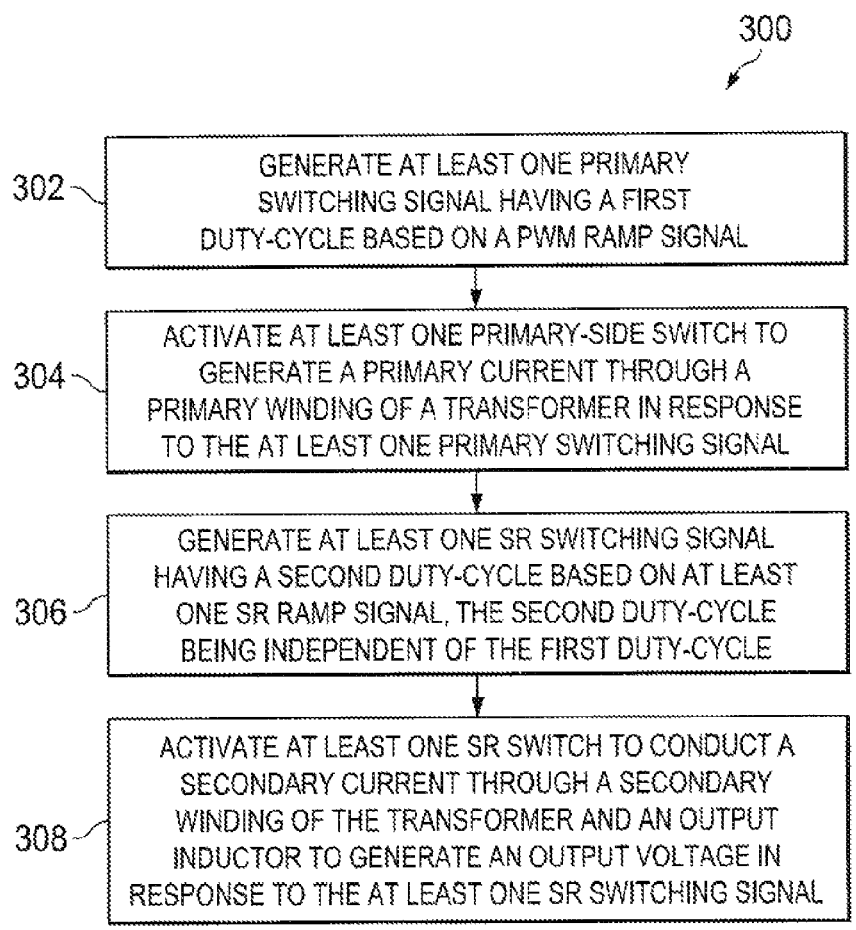
FIG. 7 illustrates an example of a method for soft-starting an isolated power supply system in accordance with an aspect of the invention.

In view of the foregoing structural and functional features described above, a methodology in accordance with various aspects of the invention will be better appreciated with reference to FIG. 7. While, for purposes of simplicity of explanation, the methodology of FIG. 7 is shown and described as executing serially, it is to be understood and appreciated that the invention is not limited by the illustrated order, as some aspects could, in accordance with the invention, occur in different orders and/or concurrently with other aspects from that shown and described herein. Moreover, not all illustrated features may be required to implement a methodology in accordance with an aspect of the invention.

FIG. 7 illustrates an example of a method 300 for soft-starting an isolated power supply system in accordance with an aspect of the invention. That is, the method 300 corresponds to a soft-start mode, such as can be implemented prior to normal or steady-state operation. At 302, at least one primary switching signal having a first duty-cycle is generated based on a PWM ramp signal. The at least one primary switching signal could include a pair of PWM switching signals that are generated from a single PWM ramp signal in a PWM switching controller. At 304, at least one primary-side switch is activated to generate a primary current through a primary winding of a transformer in response to the at least one primary switching signal. The at least one primary-side switch could include a pair of primary-side switches configured in a half-bridge arrangement.

At 306, at least one SR switching signal having a second duty-cycle is generated based on at least one SR ramp signal, the second duty-cycle being independent of the first duty-cycle. The at least one SR ramp signal could include a pair of SR ramp signals being 180° out-of-phase with respect to each other and having a frequency that is half that of the PWM ramp signal for generating a respective two SR switching signals. The at least one SR ramp signal could alternatively include a common SR ramp signal having a frequency that is approximately the same as the PWM ramp signal, and could be DC offset from the PWM ramp signal, for generating two SR switching signals at alternate clock pulses. At 308, at least one SR switch is activated to conduct a secondary current through a secondary winding of the transformer and an output inductor to, in turn, generate an output voltage in response to the at least one SR switching signal. The at least one SR switch could include a pair of SR switches that are activated by a respective pair of SR switching signals.

In view of the foregoing, those skilled in the art will understand and appreciate various benefits associated with the systems and methods disclosed herein. For example, the systems and methods enable control of SR as to prevent excessive voltage spike on transistors as well as mitigate excessive current from flowing back to the primary side through the transformer. Additionally, the systems and methods disclosed herein can be implemented without requiring inductive sensing. Yet another benefit is that the systems and methods disclosed herein can be implemented with constant switching frequency, such that the no pulse skipping or frequency variations are needed. As a result, a substantially smooth and monotonic output can be achieved at start-up with a pre-bias condition from about 0 to about 95% of the desired output range.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A switching control system for controlling a fully isolated power supply, the system comprising:
   a pulse-width modulation (PWM) switching controller configured to generate at least one primary switching signal having a first duty-cycle for activating at least one primary-side switch of the isolated power supply; and
   a synchronous rectifier (SR) switching controller located on a primary side of the isolated power supply configured to generate at least one SR switching signal having a second duty-cycle for activating at least one SR switch located on the secondary side of the isolated power supply to conduct an output current through a secondary winding of a transformer and an output inductor to generate an output voltage, the second duty-cycle being independent of the first duty-cycle in a soft-start mode, wherein the switching controller further comprises a feedback generator configured to generate a first feedback voltage and a second feedback voltage, each of the first and second feedback voltages having a magnitude that is based on the output voltage.

2. A switching control system for controlling an isolated power supply, the system comprising:
   a pulse-width modulation (PWM) switching controller configured to generate at least one primary switching signal having a first duty-cycle for activating at least one primary-side switch of the isolated power supply; and
   a synchronous rectifier (SR) switching controller configured to generate at least one SR switching signal having a second duty-cycle for activating at least one SR switch of the isolated power supply to conduct an output current through a secondary winding of a transformer and an output inductor to generate an output voltage, the second duty-cycle being independent of the first duty-cycle in a soft-start mode, wherein the switching controller further comprises a feedback generator configured to generate a first feedback voltage and a second feedback voltage, each of the first and second feedback voltages having a magnitude that is based on the output voltage, and
   wherein the PWM switching controller comprises:
   an error amplifier configured to generate an error signal based on the first feedback voltage relative to a variable soft-start voltage during the soft-start mode and a substantially fixed reference voltage; and
   a loop compensation filter interconnecting the error signal and the first feedback voltage, the primary switching signal being generated based on the error signal, and
   wherein the SR controller comprises a transconductance amplifier configured to generate a discharge signal based on the second feedback voltage and the one of the soft-start voltage during the soft-start mode and the reference voltage during steady-state mode, the SR switching signal being generated based on the error signal and an SR ramp signal having a slope that is based on the discharge signal.

3. The system of claim 2, wherein the first feedback voltage and the second feedback voltage are approximately equal during steady state operation of the isolated power supply system, and wherein the second feedback voltage varies in response to variations in the output voltage more rapidly than the first feedback voltage based on the transconductance amplifier and the loop compensation filter.

4. The system of claim 2, wherein the SR controller comprises at least one ramp generator that is controlled by the discharge signal to generate the SR ramp signal having a falling-edge slope that varies in response the second feedback voltage as to mitigate overshoot and undershoot in the output voltage.

5. The system of claim 2, wherein the at least one SR switch comprises a first SR switch and a second SR switch controlled by a first SR switching signal and a second SR switching signal, respectively, and wherein the primary PWM controller is configured to generate a PWM ramp signal, the at least one primary switching signals being generated based on the PWM ramp signal.

6. The system of claim 5, wherein the SR switching controller comprises a first ramp generator configured to generate a first SR ramp signal and a second ramp generator that is configured to generate a second SR ramp signal, the first and second ramp signals being approximately 180° out-of-phase with respect to each other and each having a frequency that is approximately half of a frequency of the PWM ramp signal, the first SR switching signal being generated based on the first SR ramp signal and the second SR switching signal being generated based on the second SR ramp signal.

7. The system of claim 5, wherein the SR controller is configured to generate an SR ramp signal having a frequency that is approximately equal to the PWM ramp signal, each of the first and second SR switching signals being generated based on the SR ramp signal.

8. The system of claim 7, wherein, during the soft-start mode, the first and second SR switching signals are generated to have a duty-cycle that varies from a predetermined minimum duty cycle to a value that is less than 1-D, where D is a positive fraction corresponding to a duty-cycle associated with the second and first primary switching signals, respectively, based on a magnitude of the SR ramp signal relative to a magnitude of a soft-start voltage, the soft-start voltage increasing from zero to a predetermined maximum voltage during the soft-start mode to define a duration of the soft-start mode.

9. The system of claim 7, wherein the SR controller comprises a voltage source configured to provide a DC voltage offset for the SR ramp signal relative to the PWM ramp signal, the first and second SR switching signals being set to a predetermined minimum duty cycle beginning at switching of the first and second primary switching signals and remain at the minimum duty cycle until a soft-start voltage crosses the SR ramp signal.

10. An integrated circuit (IC) comprising the switching control system of claim 2.

11. A method for soft-starting a fully isolated power supply system, the method comprising:
generating at least one primary switching signal having a first duty-cycle based on a pulse-width modulation (PWM) ramp signal;
activating at least one primary-side switch to generate a primary current through a primary winding of a transformer in response to the at least one primary switching signal;
generating at least one synchronous rectifier (SR) switching signal in a switching controller located on a primary side of the isolated power supply having a second duty-cycle based on at least one SR ramp signal, the second duty-cycle being independent of the first duty-cycle during a soft-start mode; and
activating at least one SR switch located on a secondary side of the isolated power supply to conduct a secondary current through a secondary winding of the transformer and an output inductor to balance charging and discharging of an output capacitor in response to the at least one SR switching signal such that an output voltage across the output capacitor increases substantially monotonically during the soft-start mode.

12. A method for soft-starting an isolated power supply system, the method comprising:
generating at least one primary switching signal having a first duty-cycle based on a pulse-width modulation (PWM) ramp signal;
activating at least one primary-side switch to generate a primary current through a primary winding of a transformer in response to the at least one primary switching signal;
generating at least one synchronous rectifier (SR) switching signal having a second duty-cycle based on at least one SR ramp signal, the second duty-cycle being independent of the first duty-cycle during a soft-start mode; and
activating at least one SR switch to conduct a secondary current through a secondary winding of the transformer and an output inductor to balance charging and discharging of an output capacitor in response to the at least one SR switching signal such that an output voltage across the output capacitor increases substantially monotonically during the soft-start mode;
providing a first feedback voltage based on the output voltage;
generating the PWM ramp signal based on the first feedback voltage;
generating a second feedback voltage independently of the first feedback voltage based on the output voltage; and
generating the at least one second ramp signal based on the second feedback voltage.

13. The method of claim 12, further comprising controlling a slope of a falling-edge of the SR ramp signal based on the second feedback voltage to mitigate overshoot and undershoot conditions associated with the output voltage.

14. The method of claim 12, wherein generating the at least one SR switching signal comprises:
generating a first SR switching signal based on a first SR ramp signal and
generating a second SR switching signal based on a second SR ramp signal,
wherein the first SR ramp signal and the second SR ramp signal are approximately 180° out-of-phase with respect to each other and each have a frequency that is approximately half of a frequency of the PWM ramp signal, and
wherein activating the at least one SR switch comprises activating a first SR switch in response to the first SR switching signal and activating a second SR switch in response to a second SR switching signal.

15. The method of claim 12, wherein activating the at least one SR switch comprises:
activating a first SR switch by a first SR switching signal;
activating a second SR switch by a second SR switching signal, each of the first SR switching signal and the second SR switching signal being generated based on a common SR ramp signal relative to a variable soft-start voltage.

16. The method of claim 15, further comprising generating the soft-start voltage that increases in magnitude from zero to a predetermined maximum voltage to define a duration of the soft-start mode,
wherein generating the at least one SR switching signal comprises generating the first SR switching signal and the second SR switching signal such that the first and second SR switching signals have a predetermined minimum duty cycle beginning at switching of the at least one primary switching signal and remains at the predetermined minimum duty cycle until the soft-start voltage crosses the SR ramp signal, from which time the first and second SR switching signals have a duty cycle that varies based on the common SR ramp signal relative to the soft-start voltage and thereby increase up to a value that is less than 1-D, where D a positive fraction corresponding to the first duty-cycle.

17. An integrated circuit (IC) for controlling an isolated power supply, the IC comprising:
a primary switching controller configured to generate the at least one primary switching signal based on a first feedback voltage and having a first duty-cycle;
a secondary switching controller configured to generate the at least one SR switching signal based on a second feedback voltage, the SR switching signal having a second duty-cycle that is based on the first duty-cycle in a steady-state operating mode and having a third duty-cycle that is independent of the first duty-cycle during a soft-start mode, the third duty-cycle varying based on the second feedback voltage to mitigate overshoot and undershoot conditions in the output voltage during a soft-start mode.

18. The IC of claim 17, further comprising:
wherein the SR controller is configured to generate at least a first SR switching signal based on a first SR ramp signal and a second SR switching signal based on a second SR ramp signal, the first and second SR ramp signals being approximately 180° out-of-phase with respect to each other and each having a frequency that is approximately half of a frequency of a PWM ramp signal utilized to generate the at least one primary switching signal, each of the first and second SR switching signals having a duty cycle that increases during the soft-start mode from about zero to something less than 1-D, where D is a fraction less than one corresponding to the duty cycle of the primary switching signal.

19. The IC of claim 17, wherein the SR controller configured to generate a first SR switching signal and a second SR switching signal based on a magnitude of an SR ramp signal relative to a soft-start voltage, the SR ramp signal having a frequency that is approximately equal to a PWM ramp signal that is utilized to generate the at least one primary switching signal, wherein during a soft-start mode, the first and second SR switching signals being generated to have a minimum predetermined duty-cycle of approximately 50% when the at least one primary switching signal begins switching until the magnitude of the soft-start voltage exceeds the magnitude of the SR ramp signal, at which the duty-cycle of the first and second SR switching signals increases from the approximately 50% up to than 1-D, where D is a positive fraction corresponding to a duty-cycle associated with the at least one primary switching signal.

* * * * *